(12) United States Patent
Rowe et al.

(10) Patent No.: US 11,724,384 B2
(45) Date of Patent: Aug. 15, 2023

(54) ARTIFICIAL MUSCLES COMPRISING A STRAIN SENSOR AND ARTIFICIAL MUSCLE ASSEMBLIES COMPRISING THE SAME

(71) Applicant: Toyota Motor Engineering & Manufacturing North America, Inc., Plano, TX (US)

(72) Inventors: Michael P. Rowe, Pinckney, MI (US); Shardul S. Panwar, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/546,360

(22) Filed: Dec. 9, 2021

(65) Prior Publication Data

US 2023/0182288 A1   Jun. 15, 2023

(51) Int. Cl.
  *B25J 9/10*   (2006.01)
  *F15B 15/10*   (2006.01)
  *B25J 9/14*   (2006.01)
  *G01B 7/16*   (2006.01)
  *B25J 9/12*   (2006.01)

(52) U.S. Cl.
  CPC ............ *B25J 9/1075* (2013.01); *B25J 9/12* (2013.01); *B25J 9/142* (2013.01); *F15B 15/103* (2013.01); *G01B 7/18* (2013.01)

(58) Field of Classification Search
  CPC ........ F15B 15/103; B25J 9/1075; B25J 9/142; G01B 7/18
  See application file for complete search history.

(56) References Cited

U.S. PATENT DOCUMENTS

2021/0196555 A1   7/2021   Kyung et al.

FOREIGN PATENT DOCUMENTS

| CN | 108158582 B | 7/2020 |
| CN | 108309293 B | 11/2020 |

(Continued)

OTHER PUBLICATIONS

So et al., Shape Estimation of Soft Manipulator Using Stretchable Sensor, AAAS vol. 2021, Article ID 9843894, pp. 1-10.*

(Continued)

*Primary Examiner* — Abiy Teka
*Assistant Examiner* — Daniel S Collins
(74) *Attorney, Agent, or Firm* — Dinsmore & Shohl LLP

(57) ABSTRACT

An artificial muscle including a housing having an electrode region and an expandable fluid region, the housing defining an upper housing portion and a lower housing portion, a strain sensor integrated into at least one of the upper housing portion and the lower housing portion of the housing, a dielectric fluid housed within the housing, and an electrode pair positioned in the electrode region of the housing. The electrode pair includes a first electrode and a second electrode, wherein the electrode pair is configured to actuate between a non-actuated state and an actuated state such that actuation from the non-actuated state to the actuated state directs the dielectric fluid into the expandable fluid region, expanding the expandable fluid region to deform the strain sensor.

13 Claims, 7 Drawing Sheets

(56) References Cited

FOREIGN PATENT DOCUMENTS

| WO | 2015138515 A1 | 9/2015 |
| WO | 2016029130 A1 | 2/2016 |
| WO | 2019173227 A1 | 9/2019 |
| WO | 2019234711 A1 | 12/2019 |

OTHER PUBLICATIONS

Harshal et al., Closed-loop Haptic Feedback Control Using a Self-sensing Soft Pneumatic Actuator Skin, Soft Robtoics, pp. 1-17, (2020).*
Koivikko et al., Screen-Printed Curvature Sensors for Soft Robots, IEEE Sensors Journal, vol. 18, No. 1, pp. 223-230, 2018.*
Flexible and stretchable strain sensing actuator for wearable soft robotic applications (https://www.researchgate.net/publication/301933161_Flexible_and_Stretchable_Strain_Sensing_Actuator_for_Wearable_Soft_Robotic_Applications), May 2016.

* cited by examiner

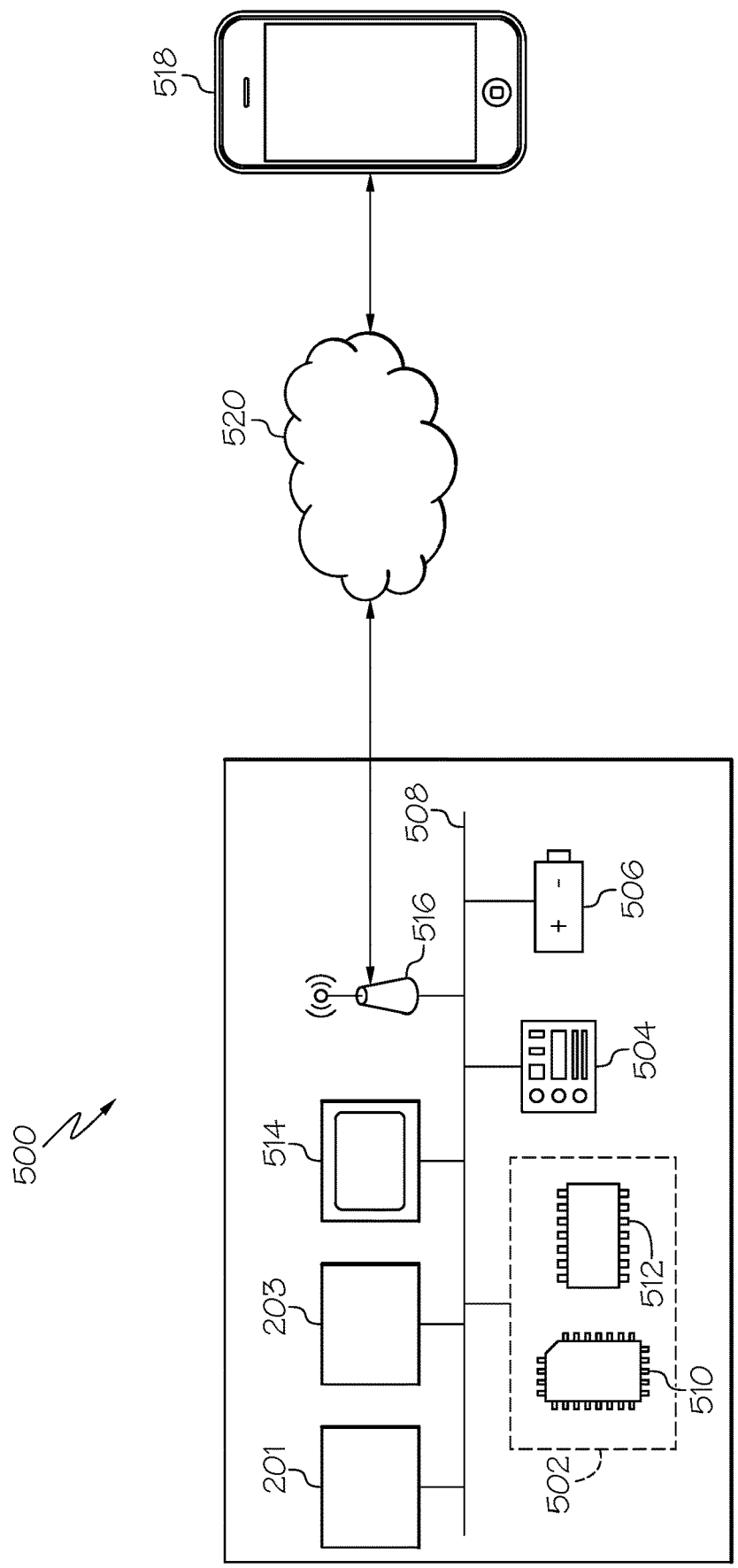

US 11,724,384 B2

ARTIFICIAL MUSCLES COMPRISING A STRAIN SENSOR AND ARTIFICIAL MUSCLE ASSEMBLIES COMPRISING THE SAME

TECHNICAL FIELD

The present specification generally relates to apparatus and methods for focused inflation on at least one surface of a device, and, more specifically, apparatus and methods for utilizing an electrode pair to direct a fluid to inflate the device.

BACKGROUND

Current robotic technologies rely on rigid components, such as servomotors to perform tasks, often in a structured environment. This rigidity presents limitations in many robotic applications, caused, at least in part, by the weight-to-power ratio of servomotors and other rigid robotics devices. The field of soft robotics improves on these limitations by using artificial muscles and other soft actuators. Artificial muscles attempt to mimic the versatility, performance, and reliability of a biological muscle. Some artificial muscles rely on fluidic actuators, but fluidic actuators require a supply of pressurized gas or liquid, and fluid transport must occur through systems of channels and tubes, limiting the speed and efficiency of the artificial muscles. Other artificial muscles use thermally activated polymer fibers, but these are difficult to control and operate at low efficiencies. Additionally, it is oftentimes difficult to measure inflation and/or deformation of these artificial muscles.

Accordingly, a need exists for improved artificial muscles with increased actuator power per unit volume and mechanisms for measuring an amount of deformation.

SUMMARY

In one embodiment, an artificial muscle including a housing having an electrode region and an expandable fluid region, the housing defining an upper housing portion and a lower housing portion, a strain sensor integrated into at least one of the upper housing portion and the lower housing portion, a dielectric fluid housed within the housing, and an electrode pair positioned in the electrode region of the housing. The electrode pair includes a first electrode and a second electrode, wherein the electrode pair is configured to actuate between a non-actuated state and an actuated state such that actuation from the non-actuated state to the actuated state directs the dielectric fluid into the expandable fluid region, expanding the expandable fluid region to deform the strain sensor.

In another embodiment, an artificial muscle including a housing having an electrode region and an expandable fluid region, a dielectric fluid housed within the housing, an electrode pair positioned in the electrode region of the housing, the electrode pair including a first electrode and a second electrode, one of the first electrode and the second electrode comprises a central opening extending therethrough, and a strain sensor extending across the central opening. The electrode pair is configured to actuate between a non-actuated state and an actuated state such that actuation from the non-actuated state to the actuated state directs the dielectric fluid through the central opening into the expandable fluid region, expanding the expandable fluid region through the central opening to deform the strain sensor.

In yet another embodiment, a method for actuating an artificial muscle, the method including: applying a voltage from a power supply to an electrode pair of the artificial muscle, the artificial muscle including a housing having an electrode region and an expandable fluid region, the housing defining an upper housing portion and a lower housing portion, the electrode pair comprising a first electrode and a second electrode positioned in the electrode region of the housing, a strain sensor integrated into one of the upper housing portion and the lower housing portion, and a dielectric fluid housed within the housing; actuating the electrode pair from a non-actuated state to an actuated state such that the dielectric fluid is directed into the expandable fluid region of the housing and expands the expandable fluid region; receiving a signal from the strain sensor indicative of deformation of the strain sensor; and determining, based on the signal from the strain sensor, an amount of deformation of the expandable fluid region.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 8 schematically depicts an actuation system for operating the artificial muscle of FIG. 1, according to one or more embodiments shown and described herein;

DETAILED DESCRIPTION

Figure 1:
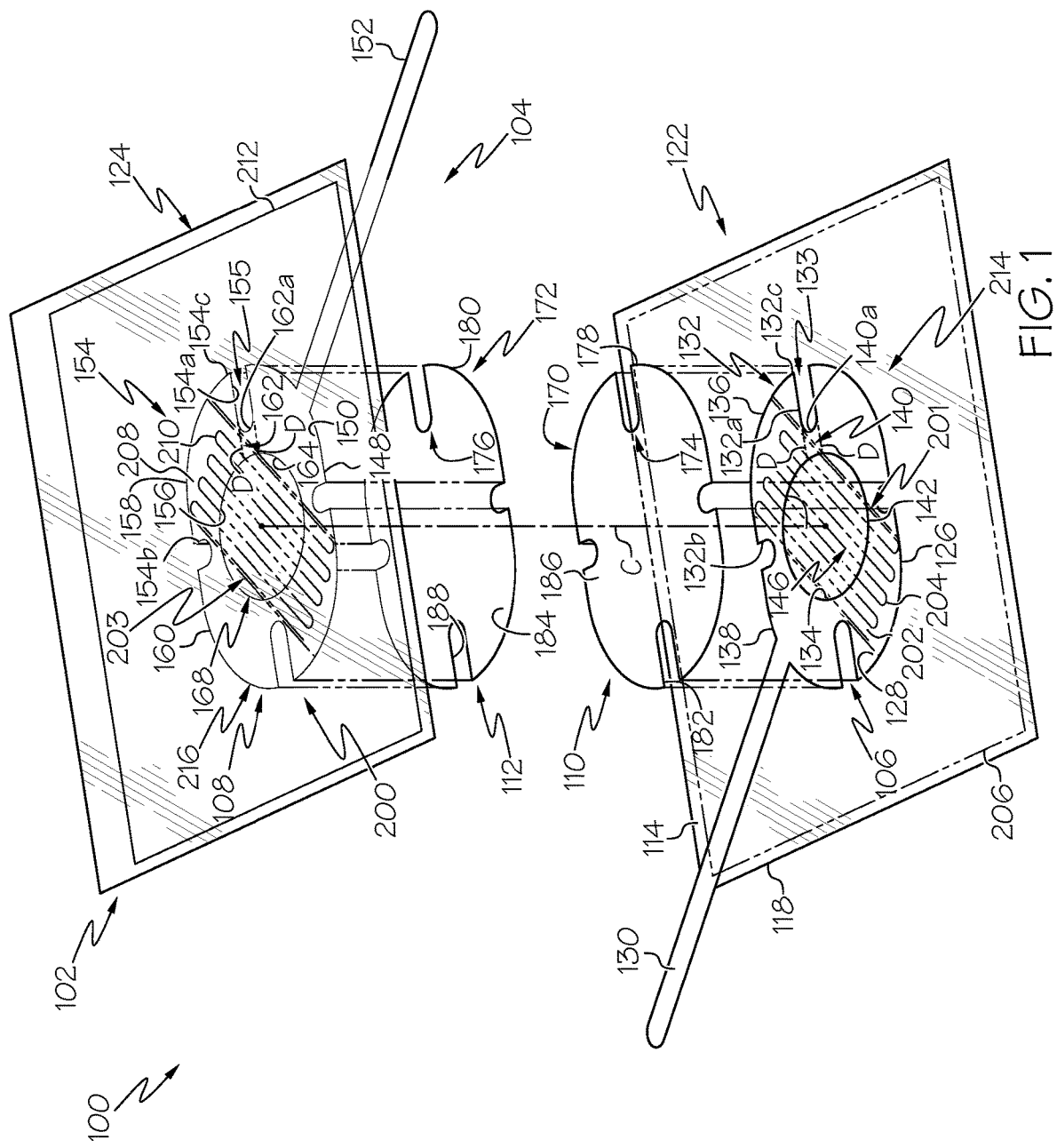
FIG. 1 schematically depicts an exploded view of an example artificial muscle, according to one or more embodiments shown and described herein.

Embodiments described herein are directed to artificial muscles and artificial muscle assemblies that include a plurality of artificial muscles and a strain sensor for determining an amount of actuation of the artificial muscle. The artificial muscles described herein are actuatable to selectively raise and lower a region of the artificial muscles to provide a selective, on demand inflated expandable fluid region. The artificial muscles include a housing and an electrode pair. A dielectric fluid is housed within the housing, and the housing includes an electrode region and an expandable fluid region, where the electrode pair is positioned in the electrode region. The electrode pair includes a first electrode, which may be fixed to a first surface of the housing and a second electrode, which may be fixed to a second surface of the housing. The electrode pair is actuatable between a non-actuated state and an actuated state such that actuation from the non-actuated state to the actuated state directs the dielectric fluid into the expandable fluid region. This expands the expandable fluid region, raising a portion of the artificial muscle on demand. Various embodiments of the artificial muscles and the operation of the artificial muscles are described in more detail herein. Whenever possible, the same reference numerals will be used throughout the drawings to refer to the same or like parts.

Figure 2:
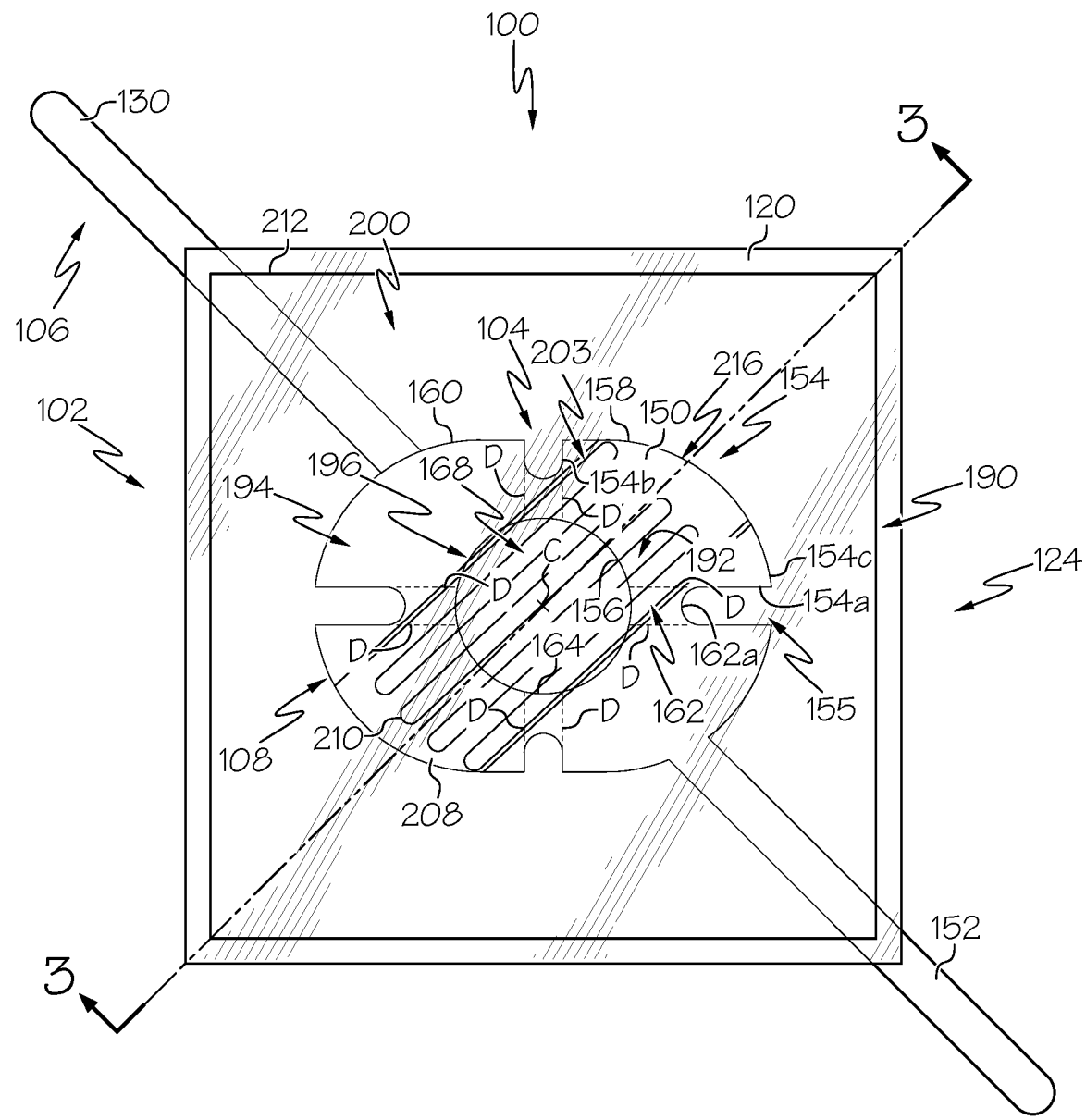
FIG. 2 schematically depicts a top view of the artificial muscle of FIG. 1, according to one or more embodiments shown and described herein.

Referring now to FIGS. 1 and 2, an artificial muscle 100 is shown. The artificial muscle 100 includes a housing 102, an electrode pair 104, including a first electrode 106 and a second electrode 108, fixed to opposite surfaces of the housing 102, a first electrical insulator layer 110 fixed to the first electrode 106, a second electrical insulator layer 112 fixed to the second electrode 108, and a strain sensor assembly 200. In some embodiments, the housing 102 is a one-piece monolithic layer including a pair of opposite inner surfaces, such as a first inner surface 114 and a second inner surface 116, and a pair of opposite outer surfaces, such as a first outer surface 118 and a second outer surface 120. In some embodiments, the first inner surface 114 and the second inner surface 116 of the housing 102 are heat-sealable. In other embodiments, the housing 102 may include a pair of individually fabricated film layers, such as a first film layer 122 and a second film layer 124. Thus, the first film layer 122 includes the first inner surface 114 and the first outer surface 118, and the second film layer 124 includes the second inner surface 116 and the second outer surface 120. The housing 102 may further include an outer shell 206, and an outer shell 212. The outer shell 206 may be coupled to the first outer surface 118 of the first film layer 122. The outer shell 212 may be coupled to the second outer surface 120 of the second film layer 124. The first film layer 122 and the outer shell 206 of the housing 102 may define a lower housing portion 214. The second film layer 124 and the outer shell 212 of the housing 102 may define an upper housing portion 216.

Throughout the ensuing description, reference may be made to the housing 102 including the first film layer 122 and the second film layer 124, as opposed to the one-piece housing. It should be understood that either arrangement is contemplated. In some embodiments, the first film layer 122 and the second film layer 124 generally include the same structure and composition. For example, in some embodiments, the first film layer 122 and the second film layer 124 each comprises biaxially oriented polypropylene.

The first electrode 106 and the second electrode 108 are each positioned between the first film layer 122 and the second film layer 124. In some embodiments, the first electrode 106 and the second electrode 108 are each aluminum-coated polyester such as, for example, Mylar®. In addition, one of the first electrode 106 and the second electrode 108 is a negatively charged electrode and the other of the first electrode 106 and the second electrode 108 is a positively charged electrode. For purposes discussed herein, either electrode 106, 108 may be positively charged so long as the other electrode 106, 108 of the artificial muscle 100 is negatively charged.

The first electrode 106 has a film-facing surface 126 and an opposite inner surface 128. The first electrode 106 is positioned against the first film layer 122, specifically, the first inner surface 114 of the first film layer 122. In addition, the first electrode 106 includes a first terminal 130 extending from the first electrode 106 past an edge of the first film layer 122 such that the first terminal 130 can be connected to a power supply to actuate the first electrode 106. Specifically, the terminal is coupled, either directly or in series, to a power supply and a controller of an actuation system 500, as shown in FIG. 9. Similarly, the second electrode 108 has a film-facing surface 148 and an opposite inner surface 150. The second electrode 108 is positioned against the second film layer 124, specifically, the second inner surface 116 of the second film layer 124. The second electrode 108 includes a second terminal 152 extending from the second electrode 108 past an edge of the second film layer 124 such that the second terminal 152 can be connected to a power supply and a controller of the actuation system 500 to actuate the second electrode 108.

With respect now to the first electrode 106, the first electrode 106 includes two or more fan portions 132 extending radially from a center axis C of the artificial muscle 100. In some embodiments, the first electrode 106 includes only two fan portions 132 positioned on opposite sides or ends of the first electrode 106. In some embodiments, the first electrode 106 includes more than two fan portions 132, such as three, four, or five fan portions 132. In embodiments in which the first electrode 106 includes an even number of fan portions 132, the fan portions 132 may be arranged in two or more pairs of fan portions 132. As shown in FIG. 1, the first electrode 106 includes four fan portions 132. In this embodiment, the four fan portions 132 are arranged in two pairs of fan portions 132, where the two individual fan portions 132 of each pair are diametrically opposed to one another.

Each fan portion 132 has a first side edge 132a and an opposite second side edge 132b. As shown, the first terminal 130 extends from the second end 136 of one of the fan portions 132 and is integrally formed therewith. A channel 133 is at least partially defined by opposing side edges 132a, 132b of adjacent fan portions 132 and, thus, extends radially toward the center axis C. The channel 133 terminates at an end 140a of a bridge portion 140 interconnecting adjacent fan portions 132.

As shown in FIG. 1, dividing lines D are included to depict the boundary between the fan portions 132 and the bridge portions 140. The dividing lines D extend from the side edges 132a, 132b of the fan portions 132 to the first end 134 of the fan portions 132 collinear with the side edges 132a, 132b. It should be understood that dividing lines D are shown in FIG. 1 for clarity and that the fan portions 132 are integral with the bridge portions 140. The first end 134 of the fan portion 132, which extends between adjacent bridge portions 140, defines an inner length of the fan portion 132.

Due to the geometry of the fan portion 132 tapering toward the center axis C between the first side edge 132a and the second side edge 132b, the second end 136 of the fan portion 132 defines an outer length of the fan portion 132 that is greater than the inner length of the fan portion 132.

Moreover, each fan portion 132 has a pair of corners 132c defined by an intersection of the second end 136 and each of the first side edge 132a and the second side edge 132b of the fan portion 132. In embodiments, the corners 132c are formed at an angle equal to or less than 90 degrees. In other embodiments, the corners 132c are formed at an acute angle.

As shown in FIG. 1, each fan portion 132 has a first side length defined by a distance between the first end 134 of the fan portion 132 and the second end 136 of the fan portion 132 along the first side edge 132a and the dividing line D that is collinear with the first side edge 132a. Each fan portion 132 also has a second side length defined by a distance between the first end 134 of the fan portion 132 and the second end 136 of the fan portion 132 along the second side edge 132b and the dividing line D that is collinear with the second side edge 132b. In embodiments, the first side length is greater than the second side length of the fan portion 132 such that the first electrode 106 has an ellipsoid geometry.

The second end 136, the first side edge 132a and the second side edge 132b of each fan portion 132, and the bridge portions 140 interconnecting the fan portions 132 define an outer perimeter 138 of the first electrode 106. In embodiments, a central opening 146 is formed within the first electrode 106 between the fan portions 132 and the bridge portions 140, and is coaxial with the center axis C. Each fan portion 132 has a fan length extending from a perimeter 142 of the central opening 146 to the second end 136 of the fan portion 132. Each bridge portion 140 has a bridge length extending from a perimeter 142 of the central opening 146 to the end 140a of the bridge portion 140, i.e., the channel 133. As shown, the bridge length of each of the bridge portions 140 is substantially equal to one another. Each channel 133 has a channel length defined by a distance between the end 140a of the bridge portion 140 and the second end of the fan portion 132. Due to the bridge length of each of the bridge portions 140 being substantially equal to one another and the first side length of the fan portions 132 being greater than the second side length of the fan portions 132, a first pair of opposite channels 133 has a channel length greater than a channel length of a second pair of opposite channels 133. As shown, a width of the channel 133 extending between opposing side edges 132a, 132b of adjacent fan portions 132 remains substantially constant due to opposing side edges 132a, 132b being substantially parallel to one another.

In embodiments, the central opening 146 has a radius of 2 centimeters (cm) to 5 cm. In embodiments, the central opening 146 has a radius of 3 cm to 4 cm. In embodiments, a total fan area of each of the fan portions 132 is equal to or greater than twice an area of the central opening 146. It should be appreciated that the ratio between the total fan area of the fan portions 132 and the area of the central opening 146 is directly related to a total amount of deflection of the first film layer 122 when the artificial muscle 100 is actuated, as discussed herein. In embodiments, the bridge length is 20% to 50% of the fan length. In embodiments, the bridge length is 30% to 40% of the fan length. In embodiments in which the first electrode 106 does not include the central opening 146, the fan length and the bridge length may be measured from a perimeter of an imaginary circle coaxial with the center axis C.

Similar to the first electrode 106, the second electrode 108 includes two or more fan portions 154 extending radially from the center axis C of the artificial muscle 100. The second electrode 108 includes substantially the same structure as the first electrode 106 and, thus, includes the same number of fan portions 154. Specifically, the second electrode 108 is illustrated as including four fan portions 154. However, it should be appreciated that the second electrode 108 may include any suitable number of fan portions 154.

Each fan portion 154 of the second electrode 108 has a first side edge 154a and an opposite second side edge 154b. As shown, the second terminal 152 extends from the second end 158 of one of the fan portions 154 and is integrally formed therewith. A channel 155 is at least partially defined by opposing side edges 154a, 154b of adjacent fan portions 154 and, thus, extends radially toward the center axis C. The channel 155 terminates at an end 162a of a bridge portion 162 interconnecting adjacent fan portions 154.

As shown in FIG. 1, additional dividing lines D are included to depict the boundary between the fan portions 154 and the bridge portions 162. The dividing lines D extend from the side edges 154a, 154b of the fan portions 154 to the first end 156 of the fan portions 154 collinear with the side edges 154a, 154b. It should be understood that dividing lines D are shown in FIG. 1 for clarity and that the fan portions 154 are integral with the bridge portions 162. The first end 156 of the fan portion 154, which extends between adjacent bridge portions 162, defines an inner length of the fan portion 154. Due to the geometry of the fan portion 154 tapering toward the center axis C between the first side edge 154a and the second side edge 154b, the second end 158 of the fan portion 154 defines an outer length of the fan portion 154 that is greater than the inner length of the fan portion 154.

Moreover, each fan portion 154 has a pair of corners 154c defined by an intersection of the second end 158 and each of the first side edge 154a and the second side edge 154b of the fan portion 154. In embodiments, the corners 154c are formed at an angle equal to or less than 90 degrees. In other embodiments, the corners 154c are formed at an acute angle. As described in more detail herein, during actuation of the artificial muscle 100, the corners 132c of the first electrode 106 and the corners 154c of the second electrode 108 are configured to be attracted to one another at a lower voltage as compared to the rest of the first electrode 106 and the second electrode 108. Thus, actuation of the artificial muscle 100 initially at the corners 132c, 154c results the outer perimeter 138 of the first electrode 106 and the outer perimeter 160 of the second electrode 108 being attracted to one another at a lower voltage and reducing the likelihood of air pockets or voids forming between the first electrode 106 and the second electrode 108 after actuation of the artificial muscle 100.

As shown in FIGS. 1 and 2, in embodiments, the first side edge 154a of each fan portion 154 has a first side length defined by a distance between the first end 156 of the fan portion 154 and the second end 158 of the fan portion 154 along the first side edge 154a and the dividing line D that is collinear with the first side edge 154a. Each fan portion 154 also has a second side length defined by a distance between the first end 156 of the fan portion 154 and the second end 158 of the fan portion 154 along the second side edge 154b and the dividing line D that is collinear with the second side edge 154b. In embodiments, the first side length is greater than the second side length of the fan portion 154 such that the second electrode 108 has an ellipsoid geometry corresponding to the geometry of the first electrode 106.

The second end 158, the first side edge 154a and the second side edge 154b of each fan portion 154, and the bridge portions 162 interconnecting the fan portions 154 define an outer perimeter 160 of the second electrode 108. In embodiments, a central opening 168 is formed within the second electrode 108 between the fan portions 154 and the bridge portions 162, and is coaxial with the center axis C. Each fan portion 154 has a fan length extending from a perimeter 164 of the central opening 168 to the second end 158 of the fan portion 154. Each bridge portion 162 has a bridge length extending from the central opening 168 to the end 162a of the bridge portion 162, i.e., the channel 155. As shown, the bridge length of each of the bridge portions 162 is substantially equal to one another. Each channel 155 has a channel length defined by a distance between the end 162a of the bridge portion 162 and the second end of the fan portion 154. Due to the bridge length of each of the bridge portions 162 being substantially equal to one another and the first side length of the fan portions 154 being greater than the second side length of the fan portions 154, a first pair of opposite channels 155 has a channel length greater than a channel length of a second pair of opposite channels 155. As shown, a width of the channel 155 extending between opposing side edges 154a, 154b of adjacent fan portions 154 remains substantially constant due to opposing side edges 154a, 154b being substantially parallel to one another.

In embodiments, the central opening 168 has a radius of 2 cm to 5 cm. In embodiments, the central opening 168 has a radius of 3 cm to 4 cm. In embodiments, a total fan area of each of the fan portions 154 is equal to or greater than twice an area of the central opening 168. It should be appreciated that the ratio between the total fan area of the fan portions 154 and the area of the central opening 168 is directly related to a total amount of deflection of the second film layer 124 when the artificial muscle 100 is actuated. In embodiments, the bridge length is 20% to 50% of the fan length. In embodiments, the bridge length is 30% to 40% of the fan length. In embodiments in which the second electrode 108 does not include the central opening 168, the fan length and the bridge length may be measured from a perimeter of an imaginary circle coaxial with the center axis C.

As described herein, the first electrode 106 and the second electrode 108 each have a central opening 146, 168 coaxial with the center axis C. However, it should be understood that the first electrode 106 does not need to include the central opening 146 when the central opening 168 is provided within the second electrode 108, as shown in the embodiment illustrated in FIGS. 6 and 7. Alternatively, the second electrode 108 does not need to include the central opening 168 when the central opening 146 is provided within the first electrode 106.

Referring again to FIG. 1, the first electrical insulator layer 110 and the second electrical insulator layer 112 have a substantially ellipsoid geometry generally corresponding to the geometry of the first electrode 106 and the second electrode 108, respectively. Thus, the first electrical insulator layer 110 and the second electrical insulator layer 112 each have fan portions 170, 172 and bridge portions 174, 176 corresponding to like portions on the first electrode 106 and the second electrode 108. Further, the first electrical insulator layer 110 and the second electrical insulator layer 112 each have an outer perimeter 178, 180 corresponding to the outer perimeter 138 of the first electrode 106 and the outer perimeter 160 of the second electrode 108, respectively, when positioned thereon.

It should be appreciated that, in some embodiments, the first electrical insulator layer 110 and the second electrical insulator layer 112 generally include the same structure and composition. As such, in some embodiments, the first electrical insulator layer 110 and the second electrical insulator layer 112 each include an adhesive surface 182, 184 and an opposite non-sealable surface 186, 188, respectively. Thus, in some embodiments, the first electrical insulator layer 110 and the second electrical insulator layer 112 are each a polymer tape adhered to the inner surface 128 of the first electrode 106 and the inner surface 150 of the second electrode 108, respectively.

Figure 3:
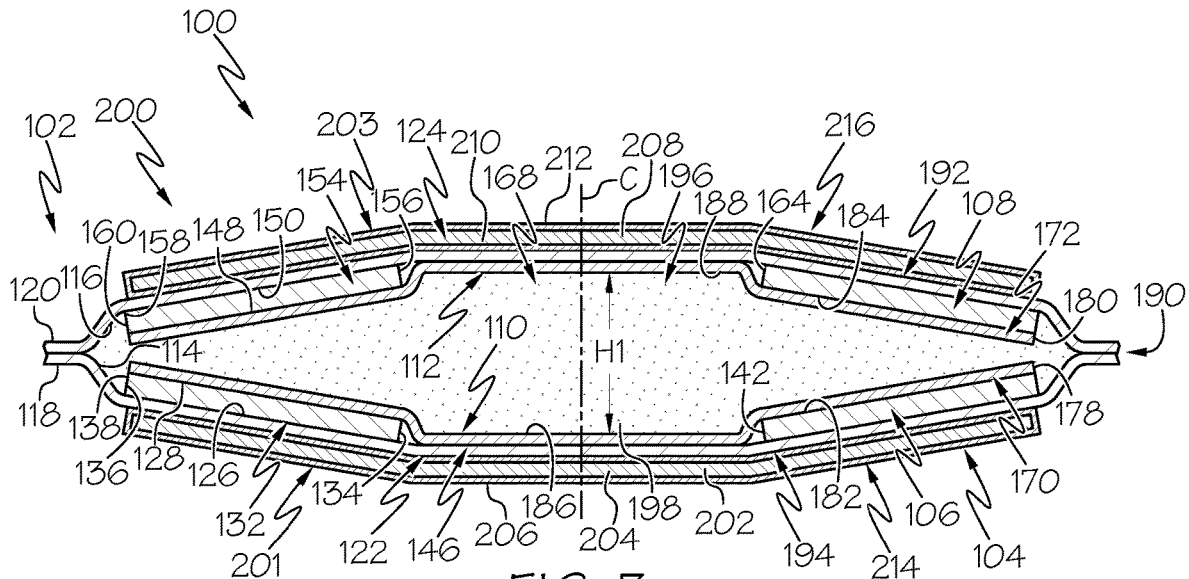
FIG. 3 schematically depicts a cross-sectional view of the artificial muscle of FIG. 1 taken along line 3-3 in FIG. 2 in a non-actuated state, according to one or more embodiments shown and described herein.
Figure 4:
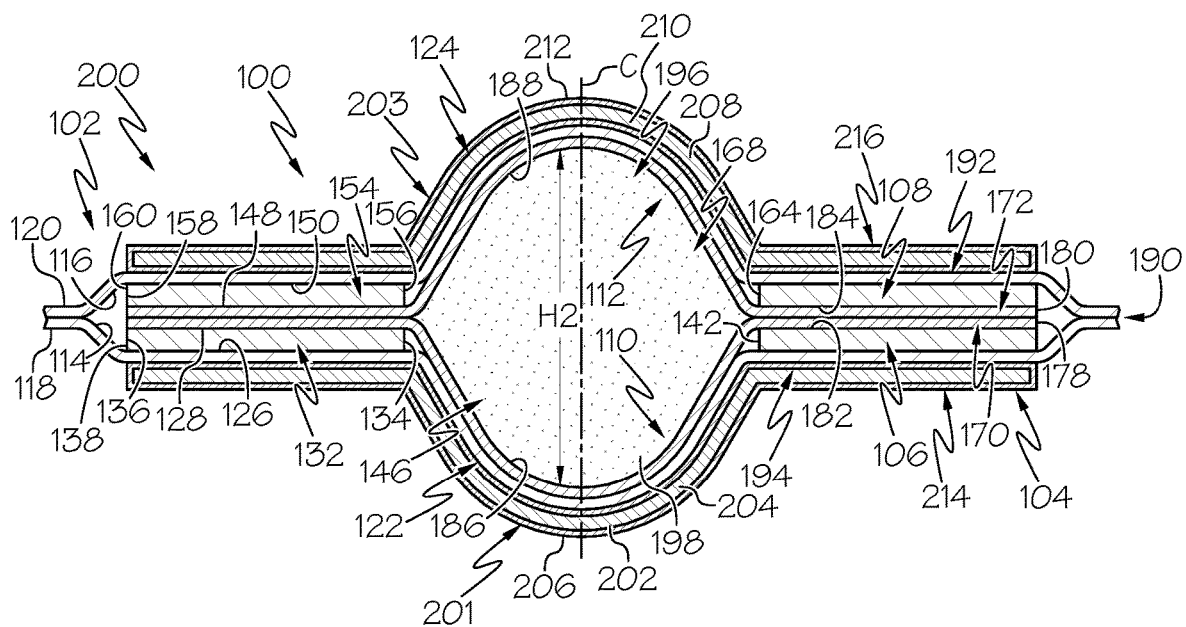
FIG. 4 schematically depicts a cross-sectional view of the artificial muscle of FIG. 1 in an actuated state, according to one or more embodiments shown and described herein.

Referring now to FIGS. 2-4, the artificial muscle 100 is shown in its assembled form with the first terminal 130 of the first electrode 106 and the second terminal 152 of the second electrode 108 extending past an outer perimeter of the housing 102, i.e., the first film layer 122 and the second film layer 124. As shown in FIG. 2, the second electrode 108 is stacked on top of the first electrode 106 and, therefore, the first electrode 106, the first film layer 122, and the second film layer 124 are not shown. In its assembled form, the first electrode 106, the second electrode 108, the first electrical insulator layer 110, and the second electrical insulator layer 112 are sandwiched between the first film layer 122 and the second film layer 124. The first film layer 122 is partially sealed to the second film layer 124 at an area surrounding the outer perimeter 138 of the first electrode 106 and the outer perimeter 160 of the second electrode 108. In some embodiments, the first film layer 122 is heat-sealed to the second film layer 124. Specifically, in some embodiments, the first film layer 122 is sealed to the second film layer 124 to define a sealed portion 190 surrounding the first electrode 106 and the second electrode 108. The first film layer 122 and the second film layer 124 may be sealed in any suitable manner, such as using an adhesive, heat sealing, vacuum sealing, or the like.

The first electrode 106, the second electrode 108, the first electrical insulator layer 110, and the second electrical insulator layer 112 provide a barrier that prevents the first film layer 122 from sealing to the second film layer 124 forming an unsealed portion 192. The unsealed portion 192 of the housing 102 includes an electrode region 194, in which the electrode pair 104 is provided, and an expandable fluid region 196, which is surrounded by the electrode region 194. The central openings 146, 168 of the first electrode 106 and the second electrode 108 define the expandable fluid region 196 and are arranged to be axially stacked on one another. Although not shown, the housing 102 may be cut to conform to the geometry of the electrode pair 104 and reduce the size of the artificial muscle 100, namely, the size of the sealed portion 190.

A dielectric fluid 198 is provided within the unsealed portion 192 and flows freely between the first electrode 106 and the second electrode 108. A "dielectric" fluid as used herein is a medium or material that transmits electrical force without conduction and as such has low electrical conductivity. Some non-limiting example dielectric fluids include perfluoroalkanes, transformer oils, and deionized water. It should be appreciated that the dielectric fluid 198 may be injected into the unsealed portion 192 of the artificial muscle 100 using a needle or other suitable injection device.

Referring to FIGS. 1-4, the strain sensor assembly 200 may include a first strain sensor 201 and a second strain sensor 203. The first strain sensor 201 and the second strain sensor 203 may be electrical resistivity sensors. However, in embodiments, the first strain sensor 201 and the second strain sensor 203 may be any sensor capable of detecting deformation.

The first strain sensor 201 may include a silk screen template 202 and a silver ink 204. The silver ink 204 may be integrated in the silk screen template 202. The silver ink 204 may be formed in parallel lines in the silk screen template 202. The parallel lines of silver ink 204 may be connected at an end of each of the lines. The ends of the lines may be connected in an alternating pattern such that an end of one of the lines is connected to a single adjacent line. Accordingly, the lines of silver ink 204 may form a wave pattern. The silk screen template 202 may be formed of a stainless steel mesh. The first strain sensor 201 may be formed by pouring the silver ink 204 on top of the silk screen template 202, and spreading the silver ink 204 across the silk screen template 202 to integrate the silver ink 204 therein. In embodiments, the silver ink 204 may be formed of any other material that increases in resistance when the material is deformed.

The first strain sensor 201 may be housed within the outer shell 206, such that the outer shell 206 surrounds the silk screen template 202 and the silver ink 204. In other embodiments, the first strain sensor 201 may be disposed on the first film layer 122 such that the first strain sensor 201 is positioned between the outer shell 206 and the first film layer 122. The outer shell 206 may be formed of the same material as the housing 102. For example, the outer shell 206 may be formed of biaxially oriented polypropylene (BOPP). In embodiments, the housing 102 may include a plurality of BOPP film layers that define the housing 102, with the first strain sensor 201 disposed between any two layers of the plurality of BOPP film layers. In embodiments, the strain sensor assembly 200 may include a single strain sensor 201 that may extend around the housing 102, such as around the first film layer 122 and the second film layer 124, to extend across both openings 146, 168.

Similarly, the second strain sensor 203 may include a silk screen template 208 and a silver ink 210 similar to that of the silk screen template 202, and the silver ink 204 of the first strain sensor 201, and will not be described again for brevity.

The second strain sensor 203 may be housing within the outer shell 212, such that the outer shell 212 surrounds the silk screen template 208 and the silver ink 210. In other embodiments, the second strain sensor 203 may be disposed on the second film layer 124 such that the second strain sensor 203 is positioned between the outer shell 212 and the second film layer 124. In embodiments, the housing 102 may include a plurality of BOPP film layers that define the housing 102. The second strain sensor 203 may be disposed between the plurality of BOPP film layers.

The first strain sensor 201 may be positioned at least partially across the central opening 146 of the first electrode 106, such that the first strain sensor 201 is deformed when the fluid 198 extends out of the central opening 146 to expand the expandable fluid region 196. The second strain sensor 203 may be positioned at least partially across the central opening 168 of the second electrode 108, such that the second strain sensor 203 is deformed when the fluid 198 extends out of the central opening 168 to expand the expandable fluid region 196. Each of the first strain sensor 201 and the second strain sensor 203 may be positioned across the entirety of the central openings 146, 168.

The strain sensors 201, 203 may be positioned to extend across one of the pairs of opposing fan portions. When positioned across the central opening 146 of the first electrode 106, the first strain sensor 201 may be positioned to extend from one of the fan portions 132 to another fan portion 132 disposed opposite the one fan portion 132 and across the central opening 146 of the first electrode 106. More particularly, the first strain sensor 201 may extend between the first side edge 132a of the one fan portion 132 and the second side edge 132b of the one fan portion 132. The first strain sensor 201 may similarly extend between the first side edge 132a and the second side edge 132b of the another fan portion 132. Similarly, the second strain sensor 203 may be positioned to extend from one of the fan portions 154 to another fan portion 154 disposed opposite the one fan portion 154 and across the central opening 168 of the second electrode 108. More particularly, the second strain sensor 203 may extend between the first side edge 154a of the one fan portion 154 and the second side edge 154b of the one fan portion 154. The second strain sensor 203 may similarly extend from the first side edge 154a to the second side edge 154b of the another fan portion 132.

Figure 9A:
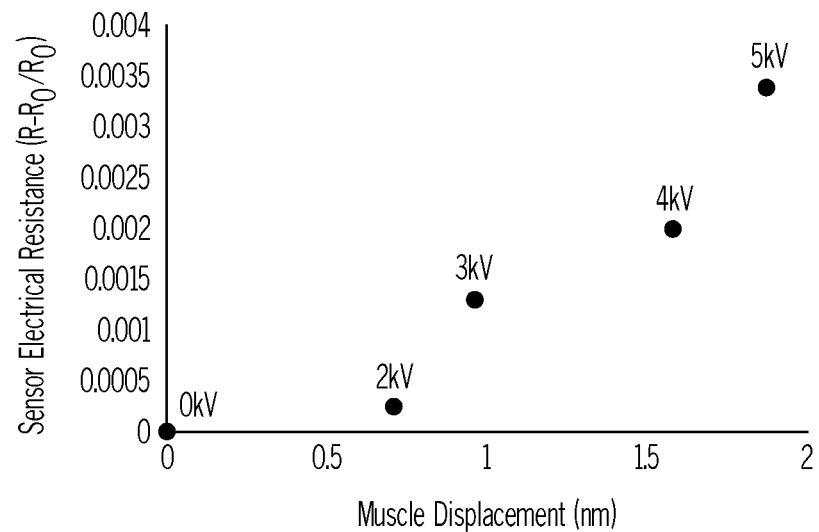
FIG. 9A depicts a graph of an electrical resistance of the sensor with respect to artificial muscle displacement, according to one or more embodiments shown and described herein.
Figure 9B:
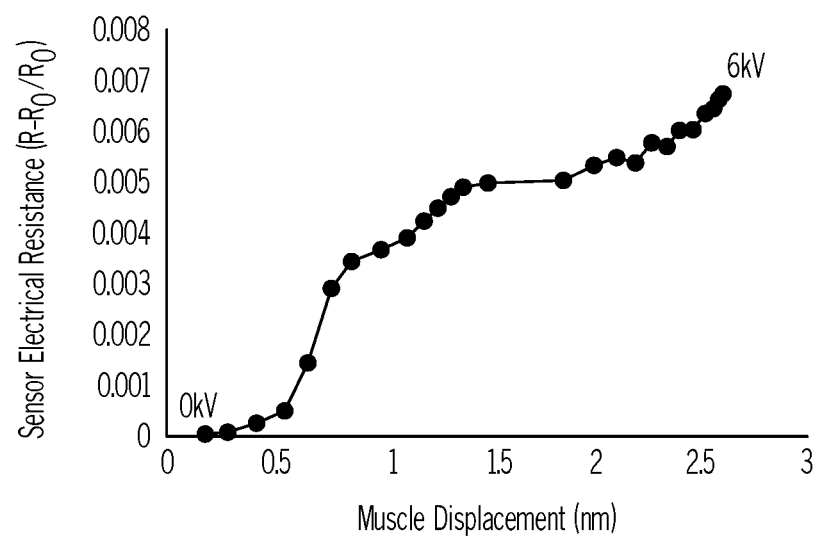
FIG. 9B depicts a graph of the electrical resistance of the sensor with respect to artificial muscle displacement over a sweeping applied actuator voltage, according to one or more embodiments shown and described herein.

Each of the strain sensors 201, 203 may be an electrical resistivity strain sensor, where the resistance of each of the strain sensors 201, 203 changes when the strain sensors 201, 203 are deformed. With reference to FIGS. 9A and 9B, the resistance of the strain sensors 201, 203 may increase as the deformation of the strain sensors 201, 203 increases. As discussed above, the expanding of the expandable fluid region 196 may deform the strain sensors 201, 203 such that the strain sensors 201, 203 may detect an amount of deformation of the expandable fluid region 196. As discussed in more detail herein and as shown in FIGS. 9A and 9B, with an increase in muscle displacement, the resistance generated by the strain sensors 201, 203 similarly increases.

Referring now to FIGS. 3 and 4, the artificial muscle 100 is actuatable between a non-actuated state and an actuated state. In the non-actuated state, as shown in FIG. 3, the first electrode 106 and the second electrode 108 are partially spaced apart from one another proximate the central openings 146, 168 thereof and the first end 134, 156 of the fan portions 132, 154. The second end 136, 158 of the fan portions 132, 154 remain in position relative to one another due to the housing 102 being sealed at the outer perimeter 138 of the first electrode 106 and the outer perimeter 160 of the second electrode 108. The first strain sensor 201 maintains a shape substantially similar to the shape of the first film layer 122. The second strain sensor 203 maintains a shape substantially similar to the shape of the second film layer 124. In the actuated state, as shown in FIG. 4, the first electrode 106 and the second electrode 108 are brought into contact with and oriented parallel to one another to force the dielectric fluid 198 into the expandable fluid region 196. This causes the dielectric fluid 198 to flow through the central openings 146, 168 of the first electrode 106 and the second electrode 108 and inflate the expandable fluid region 196. When the expandable fluid region 196 is expanded, the first strain sensor 201 and the second strain sensor 203 are deformed by the fluid 198 flowing through the central openings 146, 168, respectively. In embodiments, the central opening 146 and the central opening 168 may be sized asymmetrically, such that the expandable fluid region 196 expands a different amount through each of the central opening 146 and the central opening 168. In such embodiments, the first strain sensor 201 and the second strain sensor 203 may detect the deformation in each of the central opening 146 and the central opening 168.

Referring now to FIG. 3, the artificial muscle 100 is shown in the non-actuated state. The electrode pair 104 is provided within the electrode region 194 of the unsealed portion 192 of the housing 102. The central opening 146 of the first electrode 106 and the central opening 168 of the second electrode 108 are coaxially aligned within the expandable fluid region 196. In the non-actuated state, the first electrode 106 and the second electrode 108 are partially spaced apart from and non-parallel to one another. Due to the first film layer 122 being sealed to the second film layer 124 around the electrode pair 104, the second end 136, 158 of the fan portions 132, 154 are brought into contact with one another. Thus, dielectric fluid 198 is provided between the first electrode 106 and the second electrode 108, thereby separating the first end 134, 156 of the fan portions 132, 154 proximate the expandable fluid region 196. Stated another way, a distance between the first end 134 of the fan portion 132 of the first electrode 106 and the first end 156 of the fan portion 154 of the second electrode 108 is greater than a distance between the second end 136 of the fan portion 132 of the first electrode 106 and the second end 158 of the fan portion 154 of the second electrode 108. This results in the electrode pair 104 zippering toward the expandable fluid region 196 when actuated. More particularly, zippering of the electrode pair 104 is initiated at the corners 132c of the first electrode 106 and the corners 154c of the second electrode 108, as discussed herein. In some embodiments, the first electrode 106 and the second electrode 108 may be flexible. Thus, as shown in FIG. 3, the first electrode 106 and the second electrode 108 are convex such that the second ends 136, 158 of the fan portions 132, 154 thereof may remain close to one another, but spaced apart from one another proximate the central openings 146, 168. In the non-actuated state, the expandable fluid region 196 has a first height H1. In the non-actuated state, the first strain sensor 201 and the second strain sensor 203 are minimally deformed by the expandable fluid region 196, and each have a first resistance.

When actuated, as shown in FIG. 4, the first electrode 106 and the second electrode 108 zipper toward one another from the second ends 136, 158 of the fan portions 132, 154 thereof, thereby pushing the dielectric fluid 198 into the expandable fluid region 196. As shown, when in the actuated state, the first electrode 106 and the second electrode 108 are parallel to one another. In the actuated state, the dielectric fluid 198 flows into the expandable fluid region 196 to inflate the expandable fluid region 196. As such, the first film layer 122 and the second film layer 124 expand in opposite directions. The first strain sensor 201 and the second strain sensor 203 are deformed with the expansion of the first film layer 122 and the second film layer 124. In the actuated state, the expandable fluid region 196 has a second height H2, which is greater than the first height H1 of the expandable fluid region 196 when in the non-actuated state. Although not shown, it should be noted that the electrode pair 104 may be partially actuated to a position between the non-actuated state and the actuated state. This would allow for partial inflation of the expandable fluid region 196 and adjustments when necessary. In the actuated state, the first strain sensor 201 and the second strain sensor 203 are deformed by the expansion of the expandable fluid region 196, and each have a second resistance greater than the first resistance.

In order to move the first electrode 106 and the second electrode 108 toward one another, a voltage is applied by a power supply. In some embodiments, a voltage of up to 10 kV may be provided from the power supply to induce an electric field through the dielectric fluid 198. The resulting attraction between the first electrode 106 and the second electrode 108 pushes the dielectric fluid 198 into the expandable fluid region 196. Pressure from the dielectric fluid 198 within the expandable fluid region 196 causes the first film layer 122, the first electrical insulator layer 110, and the first strain sensor 201 to deform in a first axial direction along the center axis C of the first electrode 106 and causes the second film layer 124, the second electrical insulator layer 112, and the second strain sensor 203 to deform in an opposite second axial direction along the center axis C of the second electrode 108. Once the voltage being supplied to the first electrode 106 and the second electrode 108 is discontinued, the first electrode 106 and the second electrode 108 return to their initial, non-parallel position in the non-actuated state.

It should be appreciated that the present embodiments disclosed herein, specifically, the fan portions 132, 154 with the interconnecting bridge portions 140, 162, provide a number of improvements over actuators, such as HASEL actuators, that do not include the fan portions 132, 154. Embodiments of the artificial muscle 100 including fan portions 132, 154 on each of the first electrode 106 and the second electrode 108, respectively, increases the surface area and, thus, displacement at the expandable fluid region 196 without increasing the amount of voltage required as compared to known HASEL actuators including donut-shaped electrodes having a uniform, radially-extending width. In addition, the corners 132c, 154c of the fan portions 132, 154 of the artificial muscle 100 provide zipping fronts that result in focused and directed zipping along the outer perimeters 138, 160 of the first electrode 106 and the second electrode 108 during actuation as compared to HASEL actuators including donut-shaped electrodes. Specifically, one pair of fan portions 132, 154 provides at least twice the amount of actuator power per unit volume as compared to donut-shaped HASEL actuators, while two pairs of fan portions 132, 154 provide at least four times the amount of actuator power per unit volume. The bridge portions 140, 162 interconnecting the fan portions 132, 154 also limit buckling of the fan portions 132, 154 by maintaining the distance between the channels 133, 155 and the central openings 146, 168. Because the bridge portions 140, 162 are integrally formed with the fan portions 132, 154, the bridge portions 140, 162 also prevent tearing and leakage between the fan portions 132, 154 by eliminating attachment locations that provide an increased risk of rupturing.

In operation, when the artificial muscle 100 is actuated, expansion of the expandable fluid region 196 produces a force of 20 Newton-millimeters (N·mm) per cubic centimeter ($cm^3$) of actuator volume or greater, such as 25 N·mm per $cm^3$ or greater, 30 N·mm per $cm^3$ or greater, 35 N·mm per $cm^3$ or greater, 40 N·mm per $cm^3$ or greater, or the like. In one example, when the artificial muscle 100 is actuated by a voltage of 9.5 kilovolts (kV), the artificial muscle 100 provides a resulting force of 20 N.

Moreover, the size of the first electrode 106 and the second electrode 108 is proportional to the amount of displacement of the dielectric fluid 198. Therefore, when greater displacement within the expandable fluid region 196 is desired, the size of the electrode pair 104 is increased relative to the size of the expandable fluid region 196. It should be appreciated that the size of the expandable fluid region 196 is defined by the central openings 146, 168 in the first electrode 106 and the second electrode 108. Thus, the degree of displacement within the expandable fluid region 196 may alternatively, or in addition, be controlled by increasing or reducing the size of the central openings 146, 168.

Figure 5:
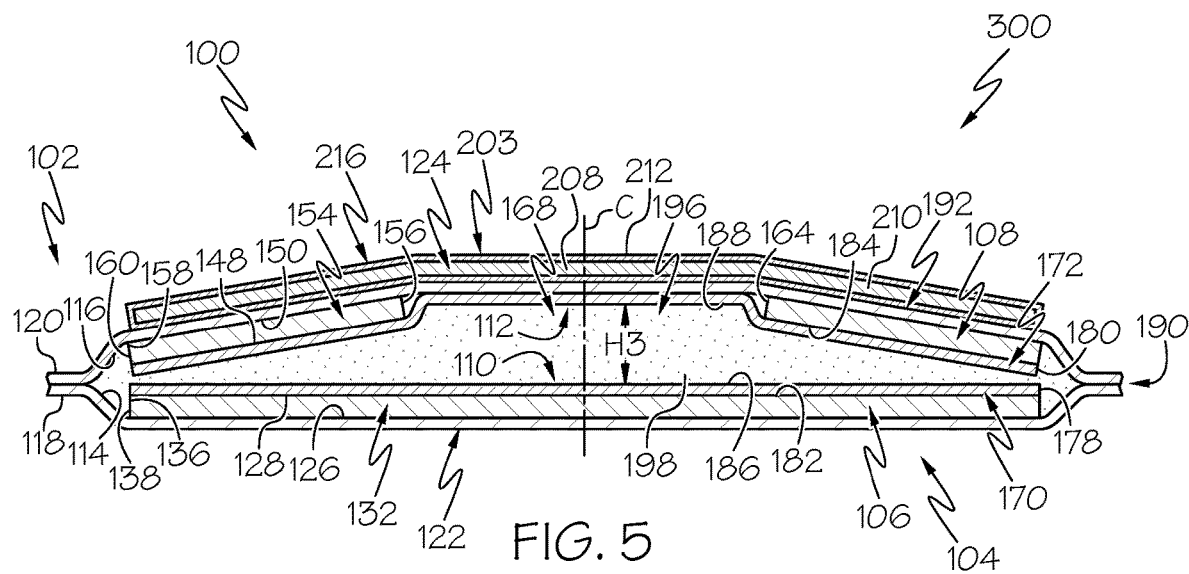
FIG. 5 schematically depicts a cross-sectional view of another example artificial muscle in a non-actuated state, according to one or more embodiments shown and described herein.
Figure 6:
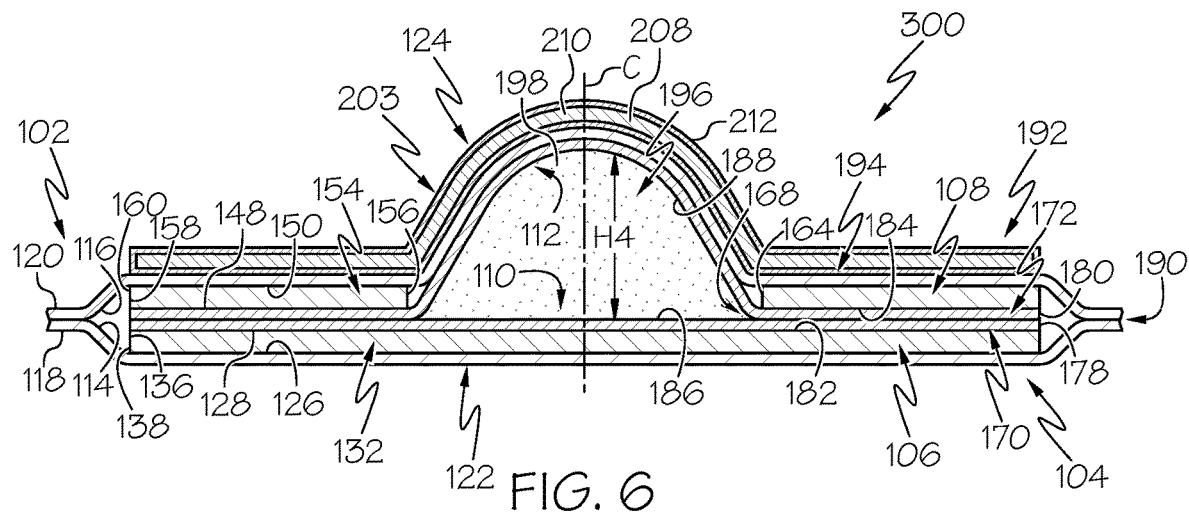
FIG. 6 schematically depicts a cross-sectional view of the artificial muscle of FIG. 5 in an actuated state, according to one or more embodiments shown and described herein.

As shown in FIGS. 5 and 6, another embodiment of an artificial muscle 300 is illustrated. The artificial muscle 300 is substantially similar to the artificial muscle 100. As such, like structure is indicated with like reference numerals.

However, as shown, the first electrode 106 does not include a central opening, such as the central opening 146. Thus, only the second electrode 108 includes the central opening 168 formed therein. Accordingly, the artificial muscle 300 includes a single strain sensor 203 disposed across the central opening 168. As shown in FIG. 5, the artificial muscle 300 is in the non-actuated state with the first electrode 106 being planar and the second electrode 108 being convex relative to the first electrode 106. In the non-actuated state, the expandable fluid region 196 has a first height H3. In the non-actuated state, the strain sensor 203 is minimally deformed and has a first resistance. In the actuated state, as shown in FIG. 6, the expandable fluid region 196 has a second height H4, which is greater than the first height H3. It should be appreciated that by providing the central opening 168 only in the second electrode 108 as opposed to both the first electrode 106 and the second electrode 108, the total deformation may be formed on one side of the artificial muscle 300. In addition, because the total deformation is formed on only one side of the artificial muscle 300, the second height H4 of the expandable fluid region 196 of the artificial muscle 300 extends further from a longitudinal axis perpendicular to the center axis C of the artificial muscle 300 than the second height H2 of the expandable fluid region 196 of the artificial muscle 100 when all other dimensions, orientations, and volume of dielectric fluid are the same. In the actuated state, the strain sensor 203 is deformed by the expansion of the expandable fluid region 196, and has a second resistance greater than the first resistance.

Figure 7:
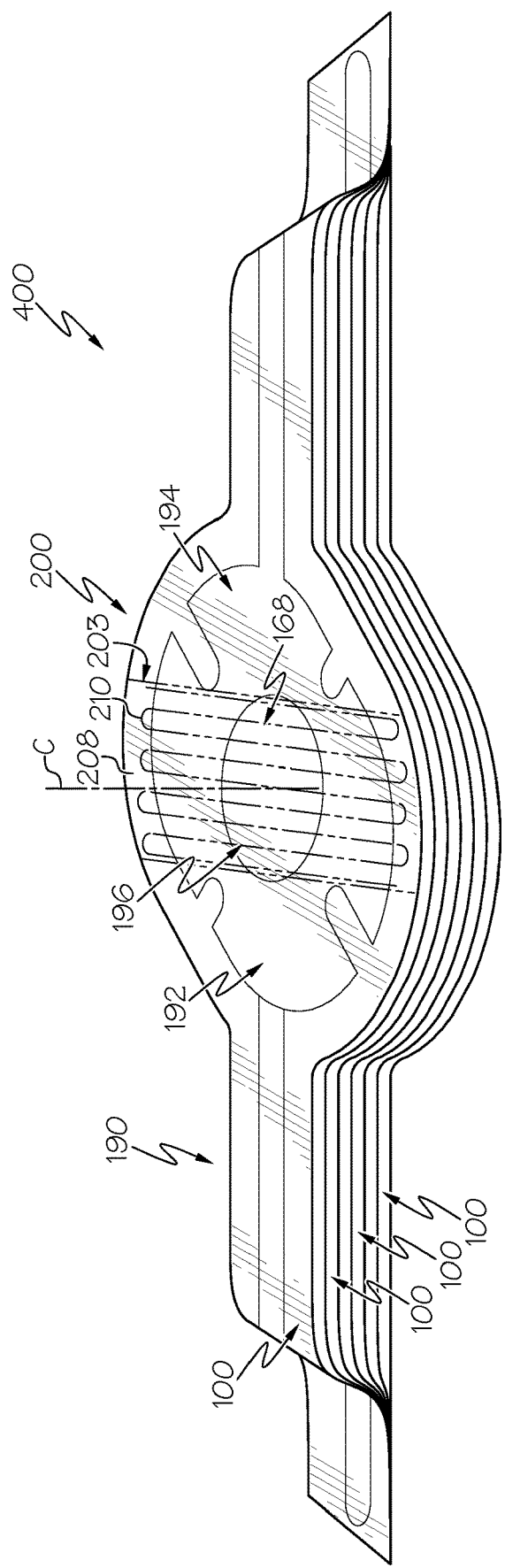
FIG. 7 schematically depicts an artificial muscle assembly including a plurality of the artificial muscles of FIG. 1, according to one or more embodiments shown and described herein.

Referring now to FIG. 7, an artificial muscle assembly 400 is shown including a plurality of artificial muscles, such the artificial muscle 100. However, it should be appreciated that a plurality of artificial muscles 100' or artificial muscles 300 may similarly be arranged in a stacked formation. Each artificial muscle 100 may be identical in structure and arranged in a stack such that the expandable fluid region 196 of each artificial muscle 100 overlies the expandable fluid region 196 of an adjacent artificial muscle 100. The terminals 130, 152 of each artificial muscle 100 are electrically connected to one another such that the artificial muscles 100 may be simultaneously actuated between the non-actuated state and the actuated state. By arranging the artificial muscles 100 in a stacked configuration, the total deformation of the artificial muscle assembly 400 is the sum of the deformation within the expandable fluid region 196 of each artificial muscle 100. As such, the resulting degree of deformation from the artificial muscle assembly 400 is greater than that which would be provided by the artificial muscle 100 alone. In the stacked configuration, the artificial muscle assembly 400 may include the first strain sensor 201, the second strain sensor 203 disposed on the outermost artificial muscle 100, or both. In embodiments, the artificial muscle assembly 400 may include a plurality of strain sensors disposed on each artificial muscle 100 in the stack of artificial muscles 100.

Referring now to FIG. 8, an actuation system 500 may be provided for operating an artificial muscle or an artificial muscle assembly, such as the artificial muscles 100, 100', 300 or the artificial muscle assembly 400 between the non-actuated state and the actuated state. Thus, the actuation system 500 may include a controller 502, an operating device 504, a power supply 506, and a communication path 508. The various components of the actuation system 500 will now be described.

The controller 502 includes a processor 510 and a non-transitory electronic memory 512 to which various components are communicatively coupled. In some embodiments, the processor 510 and the non-transitory electronic memory 512 and/or the other components are included within a single device. In other embodiments, the processor 510 and the non-transitory electronic memory 512 and/or the other components may be distributed among multiple devices that are communicatively coupled. The controller 502 includes non-transitory electronic memory 512 that stores a set of machine-readable instructions. The processor 510 executes the machine-readable instructions stored in the non-transitory electronic memory 512. The non-transitory electronic memory 512 may comprise RAM, ROM, flash memories, hard drives, or any device capable of storing machine-readable instructions such that the machine-readable instructions can be accessed by the processor 510. Accordingly, the actuation system 500 described herein may be implemented in any conventional computer programming language, as pre-programmed hardware elements, or as a combination of hardware and software components. The non-transitory electronic memory 512 may be implemented as one memory module or a plurality of memory modules.

In some embodiments, the non-transitory electronic memory 512 includes instructions for executing the functions of the actuation system 500. The instructions may include instructions for operating the artificial muscles 100, 100', 300 or the artificial muscle assembly 400 based on a user command.

The processor 510 may be any device capable of executing machine-readable instructions. For example, the processor 510 may be an integrated circuit, a microchip, a computer, or any other computing device. The non-transitory electronic memory 512 and the processor 510 are coupled to the communication path 508 that provides signal interconnectivity between various components and/or modules of the actuation system 500. Accordingly, the communication path 508 may communicatively couple any number of processors with one another, and allow the modules coupled to the communication path 508 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

As schematically depicted in FIG. 8, the communication path 508 communicatively couples the processor 510 and the non-transitory electronic memory 512 of the controller 502 with a plurality of other components of the actuation system 500. For example, the actuation system 500 depicted in FIG. 8 includes the processor 510 and the non-transitory electronic memory 512 communicatively coupled with the operating device 504, the power supply 506, the first strain sensor 201, and the second strain sensor 203.

The operating device 504 allows for a user to control operation of the artificial muscles 100, 100', 300 or the artificial muscle assembly 400. In some embodiments, the operating device 504 may be a switch, toggle, button, or any combination of controls to provide user operation. As a non-limiting example, a user may actuate the artificial muscles 100, 100', 300 or the artificial muscle assembly 400 into the actuated state by activating controls of the operating device 504 to a first position. While in the first position, the artificial muscles 100, 100', 300 or the artificial muscle assembly 400 will remain in the actuated state. The user may switch the artificial muscles 100, 100', 300 or the artificial muscle assembly 400 into the non-actuated state by operating the controls of the operating device 504 out of the first position and into a second position.

The operating device 504 is coupled to the communication path 508 such that the communication path 508 communicatively couples the operating device 504 to other modules of the actuation system 500. The operating device 504 may provide a user interface for receiving user instructions as to a specific operating configuration of the artificial muscles 100, 100', 300 or the artificial muscle assembly 400. In addition, user instructions may include instructions to operate the artificial muscles 100, 100', 300 or the artificial muscle assembly 400 only at certain conditions.

Each of the first strain sensor 201 and the second strain sensor 203 may be communicatively coupled to the controller 502 over the communication path 508. The first strain sensor 201 and the second strain sensor 203 may send signals to the controller 502 indicative of deformation of each the first strain sensor 201 and the second strain sensor 203. The first strain sensor 201 and the second strain sensor 203 may send signals to the controller 502 indicative of an electrical resistance of the respective first strain sensor 201 and second strain sensor 203. The controller 502 may be configured to determine an amount of deformation based on the received signals indicative of the detected electrical resistance of each of the Referring to FIGS. 9A and 9B, graphs of the electrical resistance of the strain sensors 201, 203 over a range of artificial muscle displacements are depicted. Initially, the electrical resistance of each of the strain sensors 201, 203 may be recorded over different muscle displacements as test data. The muscle displacement of the artificial muscle 100 may be determined using a laser displacement instrument. The laser displacement instrument may determine a muscle displacement, while the controller 502 determines an electrical resistance of one of the strain sensors 201, 203. The values of muscle displacement and electrical resistance may be recorded and correlated with one another. Referring back to FIG. 8, the electrical resistance of the strain sensors 201, 203 may be recorded over a number of muscle displacements. The correlated value pairs of electrical resistances and artificial muscle displacements may be stored in the non-transitory electronic memory 512 of the controller 502 such that the amount of future muscle displacements can be extrapolated from the previously performed test data.

The controller 502 may be configured to determine a muscle displacement of the artificial muscle 100 based on a signal received from the first strain sensor 201, the second strain sensor 203, or both. When the artificial muscle 100 is actuated, the expansion of the expandable fluid region 196 may deform the first strain sensor 201 and the second strain sensor 203. The deformation of the first strain sensor 201 and the second strain sensor 203 may increase the electrical resistance of the respective first strain sensor 201 and second strain sensor 203. The first strain sensor 201 and second strain sensor 203 may send signals to the controller 502 indicative of the electrical resistance of the respective first strain sensor 201 and second strain sensor 203. The controller 502 may then determine a muscle displacement of the artificial muscle 100 based on the signal received from the first strain sensor 201 and second strain sensor 203, and the correlated pairs recorded in the non-transitory electronic memory 512 of the controller 502. For example, when the first strain sensor 201 and the second strain sensor 203 are both provided, the sum of the resistance detected by the first strain sensor 201 and the second strain sensor 203 may be correlated to a muscle displacement. Alternatively, if only one of the first strain sensor 201 and the second strain sensor 203 are provided, such as when there is only one opening formed either the first electrode 106 or the second electrode 108, the resistance of the first strain sensor 201 or the second strain sensor 203, whichever is present, is correlated to the muscle displacement.

In other embodiments, it should be appreciated that the first strain sensor 201 and/or the second strain sensor 203 may be positioned across only one or more of the fan portions 132, 154 of the first electrode 106 and the second electrode 108, as opposed to over the central openings 146, 168 of the first electrode 106 and the second electrode 108. In this embodiment, the first strain sensor 201 and the second strain sensor 203 detect the amount of deformation within the electrode region 194, as opposed to the expandable fluid region 196. It should be appreciated that different test data may be calculated in the same manner as discussed above to correlate detected resistance of the first strain sensor 201 and the second strain sensor 203 to deformation of the electrode region 194. Further, this detected deformation of the electrode region 194 may be correlated to deformation of the expandable fluid region 196 to determine deformation of the expandable fluid region 196 without positioning the first strain sensor 201 and the second strain sensor 203 over the central openings 146, 168 of the first electrode 106 and the second electrode 108.

The power supply 506 (e.g., battery) provides power to the artificial muscles 100, 100', 300 or the artificial muscle assembly 400. In some embodiments, the power supply 506 is a rechargeable direct current power source. It is to be understood that the power supply 506 may be a single power supply or battery for providing power to the artificial muscle 100, 100', 300 or the artificial muscle assembly 400. A power adapter (not shown) may be provided and electrically coupled via a wiring harness or the like for providing power to the artificial muscles 100, 100', 300 or the artificial muscle assembly 400 via the power supply 506.

In some embodiments, the actuation system 500 also includes a display device 514. The display device 514 is coupled to the communication path 508 such that the communication path 508 communicatively couples the display device 514 to other modules of the actuation system 500. The display device 514 may output a notification in response to an actuation state of the artificial muscles 100, 100', 300 or the artificial muscle assembly 400 or indication of a change in the actuation state of the artificial muscles 100, 100', 300 or the artificial muscle assembly 400. Moreover, the display device 514 may be a touchscreen that, in addition to providing optical information, detects the presence and location of a tactile input upon a surface of or adjacent to the display device 514. Accordingly, the display device 514 may include the operating device 504 and receive mechanical input directly upon the optical output provided by the display device 514.

In some embodiments, the actuation system 500 includes network interface hardware 516 for communicatively coupling the actuation system 500 to a portable device 518 via a network 520. The portable device 518 may include, without limitation, a smartphone, a tablet, a personal media player, or any other electric device that includes wireless communication functionality. It is to be appreciated that, when provided, the portable device 518 may serve to provide user commands to the controller 502, instead of the operating device 504. As such, a user may be able to control or set a program for controlling the artificial muscles 100, 100', 300 or the artificial muscle assembly 400 without utilizing the controls of the operating device 504. Thus, the artificial muscles 100, 100', 300 or the artificial muscle assembly 400 may be controlled remotely via the portable device 518 wirelessly communicating with the controller 502 via the network 520. The portable device 518 may receive and display the determined electrical resistance or muscle displacement from the controller 502 via the network 520.

From the above, it is to be appreciated that defined herein are artificial muscles for inflating or deforming a surface of an object by selectively actuating the artificial muscle to raise and lower a region thereof. This provides a low profile inflation member that may operate on demand.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An artificial muscle comprising:
   a housing comprising an electrode region and an expandable fluid region, the housing defining an upper housing portion and a lower housing portion;
   a strain sensor integrated into at least one of the upper housing portion and the lower housing portion of the housing;
   a dielectric fluid housed within the housing;
   an electrode pair positioned in the electrode region of the housing, the electrode pair comprising a first electrode and a second electrode; and
   a controller in communication with the strain sensor,
   wherein the electrode pair is configured to actuate between a non-actuated state and an actuated state such that actuation from the non-actuated state to the actuated state directs the dielectric fluid into the expandable fluid region, expanding the expandable fluid region to deform the strain sensor,
   wherein the controller comprises a non-transitory electronic memory configured to store correlated value pairs of electrical resistance and displacement, the controller is configured to determine displacement based on detected electrical resistance of the strain sensor and the stored correlated value pairs of electrical resistance and displacement.

2. The artificial muscle of claim 1, wherein the electrode pair comprises a central opening extending through at least one of the first electrode and the second electrode, and in the actuated state, the dielectric fluid extends through the central opening to expand the expandable fluid region and deform at least one of the upper housing portion and the lower housing portion.

3. The artificial muscle of claim 2, wherein the strain sensor is positioned to extend across the central opening.

4. The artificial muscle of claim 2, wherein a central opening is formed in each of the first electrode and the second electrode, and the strain sensor is positioned across the central opening of one of the first electrode and the second electrode.

5. The artificial muscle of claim 4, further comprising a second strain sensor positioned across the central opening in the other of the first electrode and the second electrode.

6. The artificial muscle of claim 2, wherein the first electrode and the second electrode each comprise:
   a pair of opposing fan portions positioned across the central opening, each fan portion including a first end having an inner length, a second end having an outer length, a first side edge extending from the second end, and a second side edge extending from the second end, wherein the outer length is greater than the inner length; and
   two or more bridge portions, each bridge portion interconnecting adjacent fan portions at the first end of the adjacent fan portions, wherein the strain sensor extends across the pair of opposing fan portions.

7. The artificial muscle of claim 6, wherein the strain sensor extends between the first side edge and the second side edge of one of the fan portions, and extends between the first side edge and the second side edge of the other of the fan portions.

8. The artificial muscle of claim 1, wherein the strain sensor comprises a silk screen template with silver ink integrated therein, wherein deformation of the silver ink in the silk screen template increases an electrical resistance of the silver ink.

9. The artificial muscle of claim 8, wherein the silver ink is formed in parallel lines in the silk screen template.

10. An artificial muscle comprising:
    a housing comprising an electrode region and an expandable fluid region;
    a dielectric fluid housed within the housing;
    an electrode pair positioned in the electrode region of the housing, the electrode pair comprising a first electrode and a second electrode, one of the first electrode and the second electrode comprises a central opening extending therethrough;
    a strain sensor extending across the central opening; and
    a controller in communication with the strain sensor,
    wherein the electrode pair is configured to actuate between a non-actuated state and an actuated state such that actuation from the non-actuated state to the actuated state directs the dielectric fluid through the central opening into the expandable fluid region, expanding the expandable fluid region through the central opening to deform the strain sensor,
    wherein the controller comprises a non-transitory electronic memory configured to store correlated value pairs of electrical resistance and displacement, the controller is configured to determine displacement based on detected electrical resistance of the strain sensor and the stored correlated value pairs of electrical resistance and displacement.

11. The artificial muscle of claim 10, wherein the strain sensor comprises a silk screen template with silver ink integrated therein, wherein deformation of the silver ink in the silk screen template increases an electrical resistance of the silver ink.

12. The artificial muscle of claim 11, wherein the silver ink is formed in parallel lines in the silk screen template.

13. A method for actuating an artificial muscle, the method comprising:
    applying a voltage from a power supply to an electrode pair of the artificial muscle, the artificial muscle comprising:
    a housing having an electrode region and an expandable fluid region, the housing defining an upper housing portion and a lower housing portion;
    the electrode pair comprising a first electrode and a second electrode positioned in the electrode region of the housing;
    a strain sensor integrated into one of the upper housing portion and the lower housing portion; and
    a dielectric fluid housed within the housing;

actuating the electrode pair from a non-actuated state to an actuated state such that the dielectric fluid is directed into the expandable fluid region of the housing and expands the expandable fluid region;
storing correlated value pairs of electrical resistance and displacement;
receiving a signal from the strain sensor indicative of deformation of the strain sensor; and
determining, based on the signal from the strain sensor and the stored correlated value pairs of electrical resistance and displacement, an amount of deformation of the expandable fluid region.

\* \* \* \* \*

UNITED STATES PATENT AND TRADEMARK OFFICE
CERTIFICATE OF CORRECTION

PATENT NO. : 11,724,384 B2
APPLICATION NO. : 17/546360
DATED : August 15, 2023
INVENTOR(S) : Michael P. Rowe and Shardul S. Panwar It is certified that error appears in the above-identified patent and that said Letters Patent is hereby corrected as shown below:

On the Title Page

In Page 2, item (56), other Publications, cite no. 1, delete "Robtoics" and insert --Robotics--, therefor.

In the Specification

In Column 8, Line(s) 59, delete "example dielectric fluids" and insert --examples of dielectric fluids--, therefor.

In Column 15, Line(s) 12, after "only", delete "at" and insert --under--, therefor.

Signed and Sealed this
Twenty-sixth Day of September, 2023

Katherine Kelly Vidal
*Director of the United States Patent and Trademark Office*